United States Patent [19]

Kuo et al.

[11] Patent Number: 5,350,830
[45] Date of Patent: Sep. 27, 1994

[54] THERMOSETTING COATING COMPOSITIONS

[75] Inventors: Thauming Kuo; Charles H. Foster, both of Kingsport, Tenn.

[73] Assignee: Eastman Chemical Company, Kingsport, Tenn.

[21] Appl. No.: 982,545

[22] Filed: Nov. 27, 1992

[51] Int. Cl.$^5$ ............................................. C08G 63/16
[52] U.S. Cl. .................................. 528/302; 528/272;
528/274; 528/294; 528/295; 528/296; 528/298;
528/300; 528/301; 528/303; 528/306; 528/307;
528/308; 528/308.6; 528/332; 528/373;
525/437; 525/441; 525/443; 525/448; 525/450;
525/451; 525/472; 525/473; 524/366; 524/379;
524/600; 524/601; 524/602; 524/604; 524/605;
428/480; 428/482
[58] Field of Search ............... 528/272, 274, 294, 295,
528/296, 298, 300, 301, 302, 303, 306, 307, 308,
308.6, 332, 373; 525/437, 441, 443, 448, 450,
451, 472, 473; 524/366, 379, 600, 601, 602, 604,
605; 428/480, 482

[56] References Cited

U.S. PATENT DOCUMENTS

| | | | |
|---|---|---|---|
| 3,381,058 | 4/1968 | Caldwell et al. | 524/444 |
| 4,321,341 | 3/1982 | Neuberg et al. | 525/437 |
| 5,021,295 | 6/1991 | Nakane et al. | 428/379 |
| 5,021,545 | 6/1991 | Nakane et al. | 528/272 |
| 5,039,760 | 8/1991 | Nakane et al. | 525/448 |

FOREIGN PATENT DOCUMENTS 419088 3/1991 European Pat. Off. .

OTHER PUBLICATIONS

Eastman Kodak Publication No. N-278 "Resin Formulations from Eastman Industrial Chemicals", May, 1981.
K. Maruyama, et al., Japan. Kokai 75 40,629, 1975, Derwent Abstr.; (Chem. Abstr. 1975, 83, 133572y).
K. Maruyama, et al., Japan. Kokai 76 56,839, 1976, Derwent Abstr.; (Chem. Abstr. 1976, 85, 110175y).
S. Nogami, et al., Japan. Kokai 76 44,130, 1976, Derwent Abstr.; (Chem. Abstr. 1976, 85, 79835n).
S. Nogami, et al., Japan, Kokai 77 73,929, 1977, Derwent Abstr.; (Chem. Abstr. 1978, 88, 8624u).

Primary Examiner—Samuel A. Acquah
Attorney, Agent, or Firm—Bernard J. Graves, Jr.

[57] ABSTRACT

Provided are polyester resins containing hydroxy functionalized isophthalate ester moieties useful in coating compositions. The invention provides both solvent-borne as well as water-borne coating compositions comprised of the resins and a crosslinker such as a melamine-type crosslinker. Polyester resins of the present invention having a $T_g$ of greater than about 50° C. are useful in thermosetting powder coating compositions. The coatings thus provided possess excellent acid resistance, hardness, impact resistance, and stain resistance.

6 Claims, No Drawings

THERMOSETTING COATING COMPOSITIONS

FIELD OF THE INVENTION

This invention belongs to the field of polyester chemistry. In particular, this invention relates to polyester resins having hydroxy-functional isophthalate ester moieties and to thermosetting coating compositions comprised of such resins.

BACKGROUND OF THE INVENTION

U.S. Pat. No. 3,381,058 discloses the use of hydroxy-aromatic dicarboxylic acids (e.g. 5-hydroxyisophthalic acid) in preparing polyesters which have improved dyeability with basic and direct dyes. The polyester compositions disclosed in this patent are useful as fibers, but not as resins for producing coatings when crosslinked.

It is known (EP 0,419,088) that polyester resins containing terminal hydroxy groups may be capped by reacting with carboxyphenols (e.g. p-hydroxy benzoic acid) to give terminal groups such as I

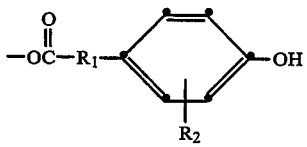

wherein $R_1$ is a direct bond, $C_1$-$C_{20}$ hydrocarbylene or $C_1$-$C_{20}$ oxyhydrocarbylene and $R_2$ is hydrogen, hydroxy, halo, $C_1$-$C_4$ alkyl, $C_1$-$C_4$ alkoxy or $C_1$-$C_4$ alkoxycarbonyl and that said resins may be crosslinked to produce coatings having enhanced properties. It is noted that the hydroxy functionalized benzoate moieties in these known compositions are monovalent—the hydroxy group is not reactive under the conditions employed for resin synthesis—and always in terminal positions on the polymer chain, in contrast to the hydroxy functionalized aromatic diester moieties of this invention which are divalent which are located randomly along the polymer chain as inherent structural units.

Lastly, it is known (Eastman Kodak Publication No. N-278, "Resin Formulations from Eastman Industrial Chemicals", May 1981) that valuable coatings can be prepared from polyester resins similar to those of this invention but without containing the hydroxy functionalized isophthalate ester moieties, the structural unit which characterizes the valuable resins/coatings of this invention. The previously known coatings have shown deficiencies in the properties of hardness, acid resistance and stain resistance, etc.

There is a need in the coatings industry for high strength, high modulus, chemically resistant coatings. This invention is directed toward meeting the above needs and the coatings described have improvements in one or more specific properties of acid resistance, pencil hardness, impact resistance, solvent resistance, gloss, etc.

The present invention provides polyester resin compositions containing hydroxy functionalized isophthalate moieties, said resins being prepared by a direct polycondensation process which is suitable for economical, large-scale production. These new resins are useful as coatings binders and may be dissolved in conventional solvents and formulated into thermosetting coating compositions which exhibit a good combination of the desirable properties mentioned above.

SUMMARY OF THE INVENTION

The present invention provides polyester resins containing hydroxy functionalized diester aromatic moieties. In a preferred embodiment of the present invention, 5-hydroxyisophthalic acid residues are incorporated into such curable polyesters. The curable polyesters of the present invention are useful in thermosetting coating compositions. The invention provides both solvent-borne as well as water-borne coating compositions comprised of the curable polyesters and a crosslinker such as an amino or melamine-type crosslinker. The coatings thus provided possess excellent acid resistance, hardness, impact resistance, and stain resistance.

The curable polyesters of the present invention are also useful in thermosetting powder coating compositions.

DETAILED DESCRIPTION OF THE INVENTION

The present invention provides a curable polyester comprised of from about 10 mol % to about 20 mol % of a hydroxy functionalized diacid component corresponding to Formula (II)

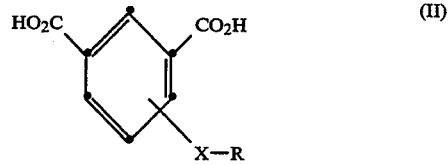

wherein X is selected from —O—, —S—, —SO$_2$—or —O(CH$_2$)—$_n$; wherein n is an integer from about 1 to about 6; R is a phenyl radical containing from 1 to 3 hydroxy groups, with the proviso that when X is —O— that R may be hydrogen. The phenyl radical may be further substituted with one or more groups selected from $C_1$-$C_4$ alkyl, $C_1$-$C_4$ alkoxy or halogen. As a preferred embodiment of the present invention, X is —O— and R is hydrogen. In a more preferred embodiment, the —X—R group is in the 5-position.

We have discovered that when a curable polyester contains structural units derived from (II) that said polyester can be used to prepare coatings having improved properties when crosslinked with conventional crosslinking agents such as a melamine-formaldehyde type crosslinker.

The curable polyester resins of this invention may have terminal end group compositions which are hydroxyl enriched or carboxyl enriched by varying the ratio of polyester reactants. The enamel compositions provided may be either solvent-borne or water-borne. Water-borne compositions are provided by incorporating a polybasic acid such as trimellitic acid in the preparation of the curable polyester resin to produce a carboxyl enriched composition which is then neutralized with an amine and dispersed with water. Alternatively, a hydroxyl enriched polyester composition may be reacted with polybasic acids/anhydrides such as trimellitic acid, trimellitic anhydride or phthalic anhydride to produce a carboxy enriched curable polyester which can be further neutralized with an amine, e.g. N,N-dimethylaminoethanol, triethyl amine or ammonia. For the preparation of water-borne enamel compositions it is desirable that the curable polyester resin have an acid number of from about 40 to about 80 as determined by ASTM method D1639.

In one embodiment of this invention there is provided a curable polyester having a number average molecular weight of about 800 to about 6,000 and a weight average molecular weight of about 3,000 to about 40,000, comprising (a) about 20 to about 60 mol % of diol residues, based on the total moles of components (a), (b), (c), (d), (e) and (f);

(b) 0 to about 20 mol % of polyol residues, based on the total moles of components (a), (b), (c), (d), (e) and (f);

(c) about 5 to about 40 mol % of hydroxy functionalized isophthalic acid residues, based on the total moles of (a), (b), (c), (d), (e) and (f); said hydroxy functionalized residues having the formula

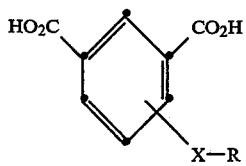

wherein X is selected from —O—, —S—, —SO₂— or —O—(CH₂—)$_n$ (n is 1 to about 6); R is a phenyl radical containing 1–3 hydroxy groups with the proviso that when X is —O— or —S—, that R may also be hydrogen;

(d) about 10 to about 40 mol % of diacid residues, derived from an aromatic diacid or a cycloaliphatic diacid or a mixture thereof, based on the total moles of (a), (b), (c), (d), (e) and (f);

(e) about 0 to about 40 mol % of diacid residues derived from an aliphatic diacid, based on the total moles of components (a), (b), (c), (d), (e) and (f);

(f) 0 to about 10 mol % of residues derived from trimellitic acid or trimellitic anhydride, based on the total moles of components (a), (b), (c), (d), (e) and (f).

In a preferred aspect of this embodiment of the present invention, it is preferred that component (d) residues be comprised of at least 50 mole % of residues of isophthalic acid.

In another embodiment of the invention there is provided an enamel composition comprising (I) about 25 to about 65 weight % of the curable polyester described immediately above; based on the total weight of components I, II, and III;

(II) about 5 to about 20 weight % of an amino cross-linking agent, based on the total weight of (I), (II) and (III);

(III) about 20 to about 70 weight % of an organic solvent, based on the total weight of (I), II and III, the total being 100%.

In another embodiment of the invention there is provided a water-borne enamel composition comprising (I) about 25 to about 65 weight % of the curable polyester described above, based on the total weight of components (I), (II), (III) and (IV); wherein said polyester, if having an acid number of 40 or less, is modified by treatment with a polybasic acid to yield a modified polyester having an acid number of about 40 to 80, followed by treatment of the polyester or modified polyester with about 1 to about 4 weight percent of an amine;

(II) about 0 to about 10 weight % of a water-miscible organic solvent, based on the total weight of (I), (II), (III), and (IV);

(III) about 30 to about 70 weight %, based on the total weight of (I), (II), (III), and (IV);

(IV) about 0 to about 20 weight % of a cross-linking agent, based on the total weight of (I), (II), (III), and (IV).

The curable polyesters of the present invention having a gloss transition temperature ($T_g$) of greater than about 50° C. may be formulated into thermosetting powder coating compositions. Thus, the present invention also provides a thermosetting powder coating composition comprising (I) about 70 to 95 weight percent of the curable polyester of the present invention, having a $T_g$ greater than about 50° C., based on the total weight of (I) and (II); and (II) about 5 to about 30 weight percent of a cross-linking agent, based on the total weight of (I) and (II).

Diol components useful in the practice of the invention include ethylene glycol; propylene glycol; 1,3-propanediol; 2,4-dimethyl-2-ethyl-hexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol, 1,6-hexanediol; 2,2,4-trimethyl-1,3-pentanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol; diethylene glycol, triethylene glycol; tetraethylene glycol; and pentaethylene, hexaethylene, heptaethylene, octaethylene, nonaethylene, and decaethylene glycols. The most highly preferred diol is 2,2-dimethyl-1,3-propanediol.

Preferred polyols include trimethylolpropane, trimethylolethane, glycerol, 2,2-bis(hydorxymethyl)-1,3-propanediol, 1,2,3,4,5,6-hexahydroxy hexane, bis(2,2-bis(hydroxymethyl)-3-propanol ether, and the like. Trimethylolpropane is the most highly preferred polyol.

Preferred hydroxy functionalized isophthalic acids include the following compounds which correspond to Formula (II) above:

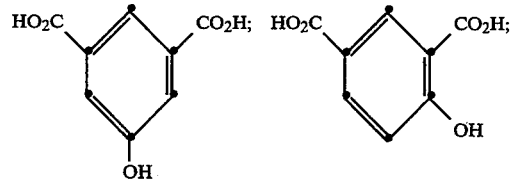

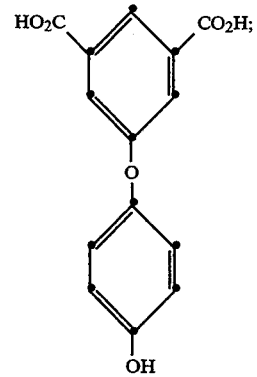

-continued

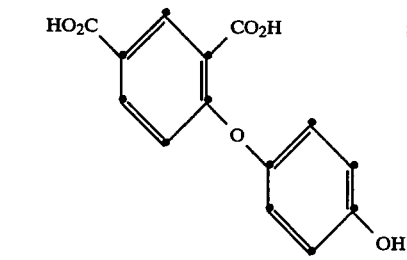

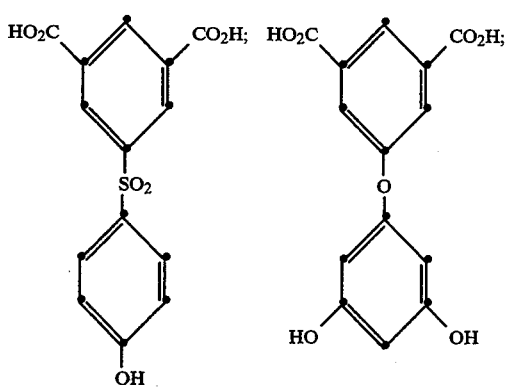

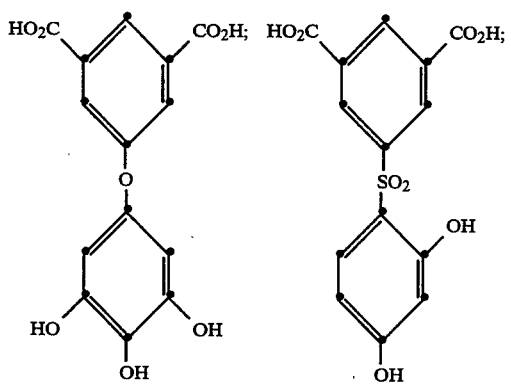

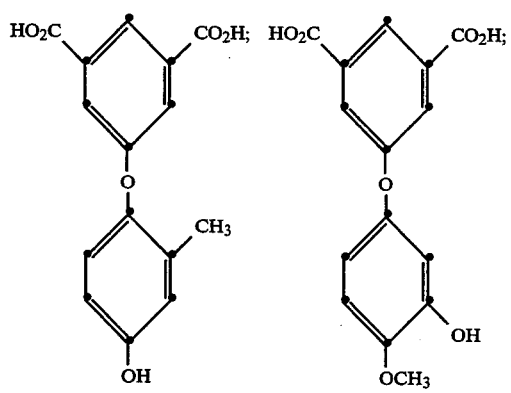

-continued

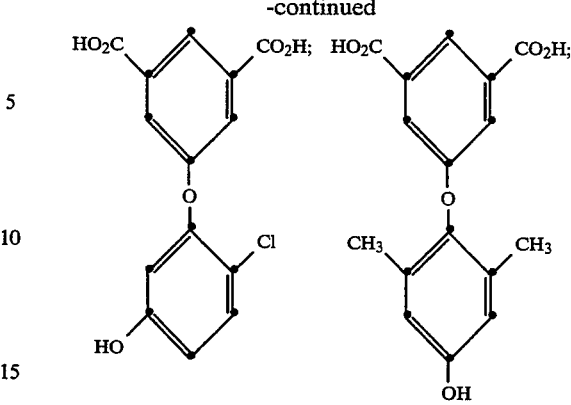

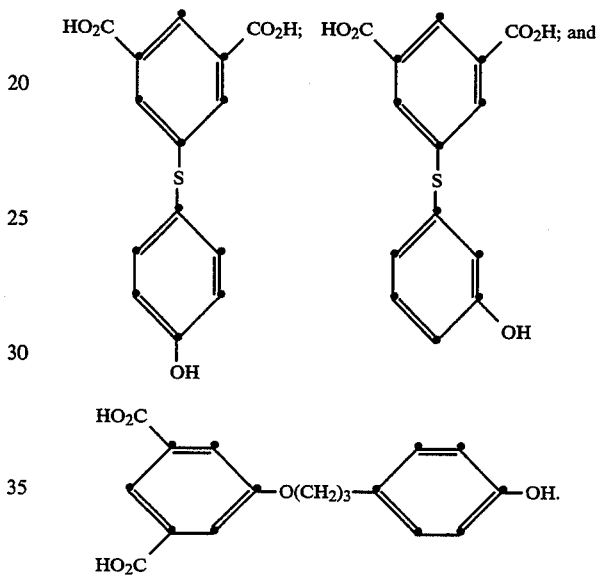

It is preferred that the isophthalic acid compounds above be hydroxy functionalized in the 5-position and 5-hydroxyisophthalic acid is further preferred.

Examples of aromatic diacid components include isophthalic, phthalic, terephthalic, diphenic, 4,4'-oxydibenzoic, 4,4'-sulfonyldibenzoic, 4,4'-biphenyldicarboxylic and naphthalenedicarboxylic acids, with isophthalic acid being particularly preferred.

Examples of aliphatic diacid components include linear straight or branched chain saturated aliphatic diacids including oxalic, malonic, dimethylmalonic, succinic, glutaric, adipic, trimethyladipic, pimelic, 2,2-dimethylglutaric, azelaic and sebacic acids and unsaturated aliphatic diacids including fumaric, maleic and itaconic acids. Adipic acid is highly preferred.

Examples of cycloaliphatic diacid components include 1,2-cyclohexanedicarboxylic acid, or anhydride, 1,3-cyclohexanedicarboxylic acid, 1,4-cyclohexanedicarboxylic acid, and 1,3-cyclopentanedicarboxylic acid, with 1,4-cyclohexanedicarboxylic acid being highly preferred.

It should be appreciated that the lower alkyl, i.e., $C_1$-$C_6$ alkyl, ester derivatives of the above mentioned acids may be utilized in the polyester producing condensation.

In the preparation of the water-borne enamel compositions above, the curable polyester is further reacted with a polybasic acid (or anhydride) to give a carboxy enriched composition having an acid number of at least 40, followed by neutralization of the carboxy groups by reacting with amines and dispersing in water. Useful polybasic acids and/or anhydrides include trimellitic anhydride, trimellitic acid, phthalic acid, phthalic anhydride, citric acid, succinic anhydride, succinic acid and the like. Typical amines include ammonia, trimethylamine, diethylamine, monoethanolamine, monoisopropanolamine, morpholine, ethanolamine, diethanolamine, triethanolamine, N,N-dimethylethanolamine, N,N-diethylethanolamine, N-methyldiethanolamine and the like. Curable polyesters having an acid number higher than 40 can be neutralized directly without the subsequent reaction of the polyester resin with the polybasic acid or anhydride followed by neutralization. The resulting polymer with hydrophilic ammonium-salt end groups can then be dispersed in water to produce water-borne enamel composition. This conventional amine-neutralization method has already been described by others in considerable detail (see, for example, Olding and Hayward, Ed., "Resins for Surface Coatings", Volume III, SITA Technology, London, 1987, p 182).

It will be appreciated, of course, that in the above description and as described below, the various mole and weight percentages in the enamel compositions and curable polyesters will always total 100 percent.

Suitable solvents for the curable enamel composition include xylenes, cyclohexanone, ketones, (for example, methyl amyl ketone), 2-butoxyethanol, ethyl-3-ethoxypropionate, toluene, n-butanol, and other volatile inert solvents typically used in industrial baking (i.e., thermosetting) enamels.

Suitable co-solvents for the water-borne compositions of the present invention include ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diacetone alcohol, and other water-miscible solvents.

The "amino cross-linking agent" is preferably a melamine-formaldehyde type cross-linking agent, i.e., a cross-linking agent having a plurality of —N(CH$_2$OR$^3$)$_2$ functional groups, wherein R$^3$ is C$_1$-C$_4$ alkyl, preferably methyl.

The cross-linking agent may also be a modified melamine-formaldehyde type resin such as toluene sulfonamide modified melamine-formaldehyde resins, and the like.

In general, the cross-linking agent may be selected from compounds of the following formulae, wherein R$^3$ is independently C$_1$-C$_4$ alkyl:

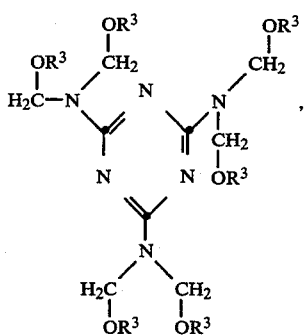

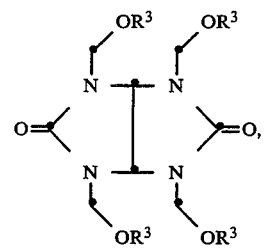

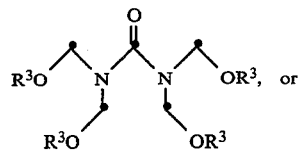

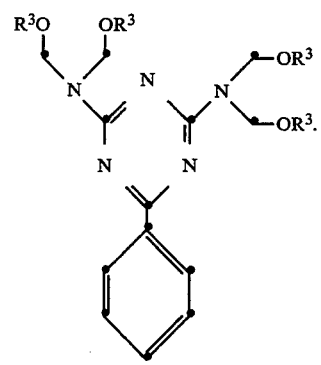

In this regard, preferred cross-linking agents include hexamethoxymethylmelamine, tetramethoxymethylbenzo-guanamine, tetramethoxymethylurea, mixed butoxy/methoxy substituted melamines, and the like. The most preferred cross-linking agent is hexamethoxymethylmelamine. Alternatively, a toluene sulfonamide methylated melaminformaldehyde resin powder may be utilized as a cross-linking agent.

In the case of thermosetting powder coating compositions, preferred cross-linking agents include cross-linking compounds with epoxy groups. Further, the carboxy functional curable polyesters of the present invention may be blended with an epoxy resin and, optionally, in the presence of another epoxy functional compound such as triglycidyl isocyanurate, and cured. Preferred epoxy functional compounds generally have a molecular weight of about 300 to about 4000, and have approximately 0.05 to about 0.99, epoxy groups per 100 g of resin (i.e., 100-2000 weight per epoxy (WPE)). Such resins are widely known and are commercially-available under the EPON ® tradename of the Shell Chemical Company, the ARALDITE ® tradename of CIBA-Geigy, and D.E.R. resins of the Dow Chemical Company.

Alternatively, the crosslinking agent may be a glycouril type. In general, such crosslinking agents possess a plurality of —N—CH$_2$OR groups with R=C$_1$-C$_8$ alkyl, such as one sold by American Cyanamid as POWDERLINK ™ 1174 having the formula

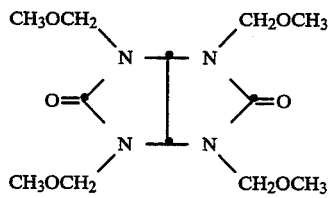

As a further aspect of the present invention, there is provided a curable enamel composition further comprising one or more cross-linking catalysts. Examples of such catalysts include p-toluenesulfonic acid, the NACURE ™ 155, 5076, and 1051 catalysts sold by King Industries, BYK ® Catalyst 450, 470, available from BYK-Chemie U.S.A., methyl tolyl sulfonimide, and the like.

As a further aspect of the present invention there is provided a cross-linkable enamel composition as described above, further comprising one or more leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewicides; corrosion inhibitors; thickening agents; or coalescing agents.

Specific examples of such additives can be found in *Raw Materials Index*, published by the National Paint & Coatings Association, 1500 Rhode Island Avenue, N.W., Washington, D.C. 20005.

Examples of flatting agents include synthetic silica, available from the Davison Chemical Division of W.R. Grace & Company under the trademark SYLOID ®; polypropylene, available from Hercules Inc., under the trademark HERCOFLAT ®; synthetic silicate, available from J.M. Huber Corporation under the trademark ZEOLEX ®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N-(1,2-dicarboxy-ethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all available from BYK Chemie U.S.A. under the trademark ANTI TERRA ®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the trademark BRU-BREAK of Buckman Laboratories Inc., under the BYK ® trademark of BYK Chemie, U.S.A., under the FOAMASTER ® and NOPCO ® trademarks of Henkel Corp./Coating Chemicals, under the DREW-PLUS ® trademark of the Drew Industrial Division of Ashland Chemical Company, under the TROYSOL ® and TROYKYD ® trademarks of Troy Chemical Corporation, and under the SAG ® trademark of Union Carbide Corporation.

Examples of fungicides, mildewicides, and biocides include 4,4-dimethyloxazolidine, 3,4,4-trimethyloxazolidine, modified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenones, substituted benzotriazoles, hindered amines, and hindered benzoates, available from American Cyanamide Company under the tradename Cyasorb UV, and available from Ciba Geigy under the tradename Tinuvin, and diethyl-3-acetyl-4-hydroxy-benzyl-phosphonate, 4-dodecyloxy-2-hydroxy benzophenone, and resorcinol monobenzoate.

Such paint or coating additives as described above form a relatively minor proportion of the enamel composition, preferably about 0.05 weight % to about 5.00 weight %.

As a further aspect of the present invention, there is provided a curable enamel composition optionally containing one or more of the above-described additives, further comprising one or more pigments.

Pigments suitable for use in the enamel compositions envisioned by the present invention are the typical organic and inorganic pigments, well-known to one of ordinary skill in the art of surface coatings, especially those set forth by the *Colour Index*, 3d Ed., 2d Rev., 1982, published by the Society of Dyers and Colourists in association with the American Association of Textile Chemists and Colorists. Examples include but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1, and CI Pigment Red 57:1.

Upon formulation as described above, the curable enamel composition is then applied to the desired substrate or article, e.g., steel, aluminum, or galvanized sheeting (either primed or unprimed), heated (i.e., cured) to a temperature of about 130° C. to about 175° C., for a time period of 5–60 minutes and subsequently allowed to cool. Thus, as a further aspect of the present invention, there is provided a shaped or formed article which has been coated with the thermosetting coating compositions of the present invention and cured.

Further examples of typical application and curing methods can be found in U.S. Pat. Nos. 4,737,551 and 4,698,391, incorporated herein by reference.

As a further aspect of the present invention, there is provided a coating which results from the application and curing of the curable enamel composition as set forth above.

The powder coating compositions of this invention are preferably prepared from the compositions described herein by dry-mixing and then melt-blending component (I) and the cross-linking compound (II), and a cross-linking catalyst, along with other additives commonly used in powder coatings, and then grinding the solidified blend to a particle size, e.g., an average particle size in the range of about 10 to 300 microns, suitable for producing powder coatings. For example, the ingredients of the powder coating composition may be dry blended and then melt blended in a Brabender extruder at 90° to 130° C. granulated and finally ground. The melt blending should be carried out at a temperature sufficiently low to avoid premature cross-linking of the composition.

Typical of the additives which may be present in the powder coating compositions include benzoin, flow aids or flow control agents which aid the formation of a smooth, glossy surface, stabilizers, pigments and dyes.

The powder coating compositions preferably contain a flow aid, also referred to as flow control or leveling agents, to enhance the surface appearance of cured coatings of the powder coating compositions. Such flow aids typically comprise acrylic polymers and are available from several suppliers, e.g., Modaflow from Monsanto Company and Acronal from BASF. Other flow control agents which may be used include Modarez MFP available from Synthron, EX 486 available from Troy Chemical, BYK 360P available from BYK Mallinkrodt and Perenol F-30-P available from Henkel. An example of one specific flow aid is an acrylic polymer having a molecular weight of about 17,000 and containing 60 mole percent 2-ethylhexyl methacrylate residues and about 40 mole percent ethyl acrylate residues. The amount of flow aid present may preferably be in the range of about 0.5 to 4.0 weight percent, based on the total weight of the resin component, and the cross-linking agent.

The powder coating compositions may be deposited on various metallic and non-metallic (e.g., thermoplastic or thermoset composite) substrates by known techniques for powder deposition such as by means of a powder gun, by electrostatic deposition or by deposition from a fluidized bed. In fluidized bed sintering, a preheated article is immersed into a suspension of the powder coating in air. The particle size of the powder coating composition normally is in the range of 60 to 300 microns. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous, uncratered coating. The temperature of the preheated article also effects cross-linking of the coating composition and results in the formation of a tough coating having a good combination of properties. Coatings having a thickness between 200 and 500 microns may be produced by this method.

The compositions also may be applied using an electrostatic process wherein a powder coating composition having a particle size of less than 100 microns, preferably about 15 to 50 microns, is blown by means of compressed air into an applicator in which it is charged with a voltage of 30 to 100 kV by high-voltage direct current. The charged particles then are sprayed onto the grounded article to be coated to which the particles adhere due to the electrical charge thereof. The coated article is heated to melt and cure the powder particles. Coatings of 40 to 120 microns thickness may be obtained.

Another method of applying the powder coating compositions is the electrostatic fluidized bed process which is a combination of the two methods described above. For example, annular or partially annular electrodes are mounted in the air feed to a fluidized bed so as to produce an electrostatic charge such as 50 to 100 kV. The article to be coated, either heated, e.g., 250° to 400° F., or cold, is exposed briefly to the fluidized powder. The coated article then can be heated to effect cross-linking if the article was not preheated to a temperature sufficiently high to cure the coating upon contact of the coating particles with the article.

The powder coating compositions of this invention may be used to coat articles of various shapes and sizes constructed of heat-resistant materials such as glass, ceramic and various metal materials. The compositions are especially useful for producing coatings on articles constructed of metals and metal alloys, particularly steel articles. As noted above, since the compositions provided by the present invention cure at a temperatures of as low as 115° C., it is also possible to coat many thermoplastic and thermosetting resin compositions with the compositions of the present invention.

Further examples of formulation methods, additives, and methods of powder coating application may be found in User's Guide to Powder Coating, 2nd Ed., Emery Miller, editor, Society of Manufacturing Engineers, Dearborn, (1987).

Experimental Section

EXAMPLE 1

Preparation of Hydroxy Terminated Resin

To a three-necked round bottom flask equipped with a mechanical stirrer, a steam partial-condenser, a Dean-Stark trap, and a water condenser were charged the following materials: neopentyl glycol (NPG) (86.82 g, 0.83 mole), trimethylolpropane (TMP) (7.98 g, 0.06 mole), isophthalic acid (IPA) (64.02 g, 0.39 mole), 5-hydroxyisophthalic acid (HIPA) (46.22 g, 0.25 mole), adipic acid (AD) (29.20 g, 0.20 mole) and 0.20 g of FASCAT 4100 catalyst (Atochem North America, Inc). The mixture was heated to 150° C. and stirred under a nitrogen atmosphere. The temperature was then gradually increased to 200° C. and held for about 4.5 hours and distillate collected in the Dean-Stark trap. The resulting viscous resin was collected in a metal container and cooled to room temperature. The resin has the following composition based on the mol % of the components present: NPG (48.0%), TMP (3.5%), IPA (22.5%), HIPA (14.4%) and AD (11.6%).

EXAMPLE 2

Preparation of Enamel 1

The hydroxy enriched resin from Example 1 (20.0 g) was dissolved in 40 mL of a solvent mixture [55% xylene, 32% methyl n-amyl ketone (MAK), 6.5% ethyl 3-ethoxypropionate (EEP) and 6.5% butyl alcohol by weight]. To this solution were added 5 g of a crosslinking agent, hexamethoxymethyl melamine, CYMEL 303 (American Cyanamid), an acid catalyst (0.38 g of a 40% p-toluenesulfonic acid solution in isopropanol by weight) and a flow control additive [0.38 g of a 20%

FLUORAD FC-430 (3M Company) solution in isopropanol by weight]. The mixture was stirred by using a mixer, IKA~Ultra Turrax T25, to obtain a clear enamel composition.

The enamel was applied to cold-rolled steel test panels and baked at 175° C. for 20 min. The film thickness was about 1.0–1.5 mil. The coating testings were carried out according to following standard methods:
1. Gloss (BYK—micro-gloss, ASTM Method D523)
2. Hardness (Pencil Method, ASTM D3362)
3. Impact resistance (BYK—Gardner Impact Tester, ASTM D2794)

The acid-etch resistance of the coatings was determined by adding a few drops of 10% sulfuric acid (e.g. six drops) onto the film surface of the coated panel and baking in an oven at 50° C. for 0.5 hour. The residual acid solution was washed off and the surface observed for loss of gloss/loss of adhesion.

The enamel had excellent gloss, chemical resistance, impact resistance and pencil hardness. Compared to an enamel (Comparative Examples 1 and 2) which was prepared from a control resin not containing the hydroxy-functionalized isophthalate ester moiety, this enamel had much improved hardness and acid-etch resistance (See Table 1).

COMPARATIVE EXAMPLE 1

(Hydroxy Terminated Control Resin Without Hydroxy Functionalized Isophthalic Acid Component)

To a three-necked round bottom flask equipped with a mechanical stirrer, a steam partial condenser, a Dean-Stark trap, and a water condenser were charged the following reactants: NPG (86.82 g, 0.83 mole), TMP (7.98 g, 0.06 mole), IPA (106.18 g, 0.64 mole), AD (29.20 g, 0.20 mole) and 0.20 g of FASCAT 4100 catalyst (Atochem North America, Inc). The mixture was heated to 200° C. and stirred under a nitrogen atmosphere and held at 200° C. for about 2 hours and distillate collected in the Dean-Stark trap. The temperature was increased to 220° C. and held for about 2.0 additional hours and further distillate collected. The resulting viscous resin was collected in a metal container and allowed to cool to room temperature. The resin has the following composition based on the mol % of the components present: NPG (48.0%), TMP (3.5%), IPA (37.0%) and AD (11.5%).

COMPARATIVE EXAMPLE 2

(Comparative Enamel 1)

A portion (20.0 g) of the hydroxy enriched control resin of Comparative Example 1 was dissolved in 40 mL of a solvent mixture (15% xylene, 70% methyl n-amyl ketone and 15% ethyl 3-ethoxypropionate). To this solution were added 5 g of a crosslinking agent, hexamethoxymethyl melamine, CYMEL 303 (American Cyanamid), an acid catalyst (0.38 g of a 40% p-toluenesulfonic acid solution in isopropanol) and a flow control additive [0.38 g of a 20% FLUORAD FC-430 (3M Company) solution in isopropanol by weight]. The mixture was stirred with a mixer for 5 min. to obtain a clear enamel composition.

The enamel was applied to a cold-rolled steel test panel and the resulting enamel tested as described in Example 2. Properties are reported in Table 1.

EXAMPLE 3

Preparation of Carboxy Terminated Resin

To a three-necked round bottom flask equipped with a mechanical stirrer, a steam partial condenser, a Dean-Stark trap, and a water condenser were charged the following reactants: NPG (79.16 g, 0.761 mole), IPA (44.24 g, 0.266 mole), HIPA (43.18 g, 0.237 mole), trimellitic anhydride (16.37 g, 0.085 mole) and 0.20 g of FASCAT 4100 catalyst (Atochem North America, Inc). The mixture was heated to 150° C. and stirred under a nitrogen atmosphere. The temperature was then gradually increased to 200° C. and held for about 1 hour and distillate collected in the Dean-Stark trap. After allowing the reaction mixture to cool slightly, AD (40.97 g, 0.281 mole) was added and the polycondensation reaction continued by heating the mixture at 200° C. for 1.5 hours. The resulting viscous resin was collected in a metal container and allowed to cool to room temperature. The resin has the following composition based on the mol % of the components present: NPG (46.7%), IPA (16.3%), HIPA (14.6%), TMA (5.2%) and AD (17.2%).

EXAMPLE 4

Preparation of Enamel 2

A clear enamel composition was prepared from the carboxy terminated resin prepared in Example 3 (20.0 g) exactly as described in Comparative Example 2 and the enamel applied to a steel test panels as described in Example 2. The properties of gloss, pencil hardness and impact resistance were determined by standard methods mentioned in Example 2. The solvent resistance was also determined (ASTM Method D1308). The results are reported in Table II. Compared to an enamel (Comparative Examples 3 and 4) which was prepared from a control resin not containing the hydroxy functionalized isophthalate ester moiety, this enamel had much improved impact strength, pencil hardness, and solvent resistance.

COMPARATIVE EXAMPLE 3

(Carboxy Terminated Control Resin Without Hydroxy Functionalized Isophthalic Acid Component)

To a three-neck round bottom flask equipped with a mechanical stirrer, a steam partial condenser, a Dean-Stark trap and a water condenser were charged the following reactants: NPG (79.16 g, 0.760 mole), IPA (83.58 g, 0.500 mole), TMA (16.37 g, 0.085 mole) and 0.20 g of FASCAT 4100 catalyst (Atochem North America, Inc). The mixture was heated to 180° C. and stirred under a nitrogen atmosphere. The temperature was gradually increased to 200° C. and held for about 2.0 hours and distillate collected in the Dean-Stark trap. After allowing the reaction mixture to cool slightly, AD (40.97 g, 0.280 mole) was added and the polycondensation reaction continued by heating the reaction mixture at 200° C. for about 2.0 hours. The resulting viscous resin was collected in a metal container and allowed to cool to room temperature. The resin has the following composition based on the mol % of the components present: NPG (46.8%), IPA (30.8%), TMA (5.2%) and AD (17.2%).

COMPARATIVE EXAMPLE 4

(Comparative Enamel 2)

A portion (20.0 g) of the carboxy enriched control resin of Comparative Example 3 was dissolved in 40 mL of a solvent mixture (15% xylene, 70% methyl n-amyl ketone and 15% ethyl 3-ethoxypropionate). To this solution was added 5 g of a crosslinking agent, hexamethoxymethyl melamine, CYMEL 303 (American Cyanamid), an acid catalyst (0.38 g of a 40% p-toluenesulfonic acid solution in isopropanol) and a flow control additive [0.38 g of a 20% FLUORAD FC-430 (3M Company) solution in isopropanol by weight.] The mixture was stirred with a mixer for 5 min. to obtain a clear enamel composition.

The enamel was applied to a cold-rolled steel test panel and the resulting enamel tested as described in Example 4. The results are reported in Table II.

EXAMPLE 5

Preparation of Water-Borne Enamel Composition

A portion (40.0 g) of the carboxy terminated resin of Example 3 was heated to 100° C. and a solvent, ethylene glycol monobutylether (10 g) was added. The resin was dispersed by adding a solution of dimethylaminoethanol (5.0 g) in water (140 g) with good agitation at 50° C. The water dispersion was subsequently mixed with CYMEL 303 (10 g) and FLUORAD FC-430 (20% in isopropanol, 0.6 g) to yield a water-borne enamel having a pH of about 6.8.

The enamel was applied to a cold-rolled steel test panel and the resulting enamel tested as described in Example 2. The cured enamel had good gloss (60°/20°=102/87), excellent impact resistance (direct-/reverse=60/160 lb-in) and excellent pencil hardness (4 H).

TABLE I
PROPERTIES OF ENAMELS

| PROPERTY | ENAMEL 1 (EXAMPLE 2) | COMPARATIVE ENAMEL 1 (COMPARATIVE EXAMPLE 2) |
|---|---|---|
| Gloss 60°/20° | 101/90 | 100/89 |
| Pencil Hardness | 5H | H |
| Impact Resistance Direct/Reverse (lb-in.) | 160/160 | 160/160 |
| Acid-Etch Resistance 10% H₂SO₄ 0.5 hr at 50° C. | No Effect | Loss of Gloss/Adhesion |
| Stain Resistance Iodine, 0.5 hr. | No Effect | Slight Effect |

TABLE II
PROPERTIES OF ENAMELS

| PROPERTY | ENAMEL 2 (EXAMPLE 4) | COMPARATIVE ENAMEL 2 (COMPARATIVE EXAMPLE 4) |
|---|---|---|
| Gloss 60°/20° | 98/81 | 97/61 |
| Pencil Hardness | 4–5 H | H |
| Impact Resistance Direct/Reverse (lb-in.) | 160/160 | <20/<20 |
| Solvent Resistance MEK | No Effect | Scratches |
| Double Rub, 200 | | |

EXAMPLE 6

Preparation of High $T_g$ Resin for Powder Coatings

To a three-necked round bottom flask equipped with a mechanical stirrer, a steam partial-condenser, a Dean-Stark trap, and a water condenser were charged the following materials: NPG (111.54 g, 1.07 mole), TMP (5.58 g, 0.04 mole), terephthalic acid (TPA) (114.99 g, 0.69 mole), HIPA (53.37 g, 0.29 mole), and 0.20 g of FASCAT 4100 catalyst. The mixture was heated to 150° C. and stirred under nitrogen atmosphere. The temperature was then gradually increased to 220° C. and held for about 8 hours and distillate collected in the Dean-Stark trap. The resulting viscous resin was collected in a metal container and cooled to room temperature. The resin has the following compositions based on the mole percent of the components present: NPG (51.2%), TMP (1.9%), TPA (33.0%), and HIPA (13.9%). The resin has a $T_g$ of 66° C. and a number average molecular weight of 2400.

Examples of Powder Coatings from Resins with Phenolic Pendant Groups

In the Examples below, the inherent viscosity (I.V.), in dl/g were determined in phenol/tetrachloroethane (60/40 w/w) at a concentration of 0.5 g/100 ml.

The resin melt viscosity, in poise, were determined using an ICI melt viscometer at 200° C.

The acid number and hydroxyl number were determined by titration and reported as mg of KOH consumed for each gram of resin.

The glass transition temperature (Tg), was determined by differential scanning calorimetry (DSC) on the second heating cycle scanning rate at 20° C./minute after the sample had been heated to melt and quenched to below the resin Tg. Tg values are reported as midpoint.

The weight average molecular weight (Mw) and number average molecular weight (Mn) were determined by gel permeation chromatography in tetrahydrofuran (THF) using polystyrene standard and a UV detector.

Impact strengths were determined using a Gardner Laboratory, Inc., impact tester per ASTM D 2794-84.

Pencil hardness was determined using ASTM D 3363-74. The hardness is reported as the hardest pencil which will not cut into the coating. The results are expressed according to the following scale: (softest) 6B,5B,4B,3B,2B,B,HB,F,H,2H,3H,4H,5H,6H (hardest).

The conical mandrel was performed using a Gardener Laboratory Inc., conical mandrel of specified size according to ASTM-522.

The 20 and 60 degree gloss were measured using a gloss meter (Gardener Laboratory, Inc. Model GC-9095) according to ASTM D-523.

1. Hydroxyl terminated resin with 4-hydroxyisophthalic acid for powder coating composition (Resin PC)

To a 3000 ml, 3-neck round bottom flask were added 2,2-dimethyl-1,3-propanediol (917.2 g, 8.806 moles) and FASCAT TM 4100 (2.0 g). The content was heated to melt at 180° C. and terephthlic acid (1271.8 g, 7.654 moles), and 4-hydroxyisophthalic acid (121.2 g, 0.666 moles) was added. The flask was swept with 1.0 scfh nitrogen while the temperatures was raised from 180° C. to 230° C. over a 6-hour period. The batch temperature was maintained at 230° C. for 8 hours. The molten resin was poured to a syrup can where it cooled to a solid with the following properties:

| | |
|---|---|
| I.V. | 0.265 dl/g |
| ICI Melt Viscosity at 200° C. | 22 poise |
| Acid Number | 33.8 |
| Hydroxyl number | 41.0 |
| DSC (2nd cycle) Tg | 67° C. |
| Gel permeation chromatography | |
| Mw | 7,703 |
| Mn | 2,991 |

2. Powder Coating Composition comprising hydroxyl terminated Resin PC and POWDERLINK TM 1174

This example provides a powder coating with superior cure, solvent resistance (MEK rubs), impact resistance and conical mandrel properties.

Resin PC (376.0 g), POWDERLINK TM 1174 (24.0 g), Methyltolyl sulfonimide (5.0 g), Flow aid (6.0 g), benzoin (4.0 g), and titanium dioxide (160.0 g) were mixed in a Vitamix mixer and compounded in an APV extruder at 125° C. The extrudate was cooled, granulated, and pulverized in a Bantam mill with liquid nitrogen bled into the grinding chamber. The powder was classified through a 200 mesh screen. The powder was electrostatically applied to a 3 in.×9 in. metal panel and cured in a 350° F. oven for 20 minutes. The film properties are as follows:

| | |
|---|---|
| Film thickness, Mil | 2.2 |
| Impact strength, (in.-lb) | |
| Front | 140 |
| Reverse | 160 |
| Pencil Hardness | F |
| Gloss | |
| 20 deg | 74 |
| 60 deg | 101 |
| ⅛" conical Mandrell | pass |
| MEK double rubs | more than 200 |

3. Powder Coating from Commercial ARAKOTE TM 3109 (Ciba-Geigy) and POWDERLINK TM 1174 (American Cyanamid)

This comparative example provides powder coating from a commercial resin with less cure and thus poorer overall properties.

ARAKOTE TM 3109 (376.0 g), POWDERLINK TM 1174 (24.0 g), Methyl tolyl sulfonimide (5.0 g), flow aid (6.0 g), benzoin (4.0 g), and titanium dioxide (160.0 g) are mixed in a Vitamix mixer and compounded in an APV extruder at 125° C. The extrudate was cooled, granulated, and pulverized in a Bantam mill with liquid nitrogen bled into the grinding chamber. The powder was classified through a 200 mesh screen. The powder was electrostatically applied to a 3 in.×9 in. metal panel and cured in a 350° F. oven for 20 minutes. The film properties are as follows:

| | |
|---|---|
| Film thickness, Mil | 2.0 |
| Impact strength, (in.-lb) | |
| Front | 20 |
| Reverse | less than 20 |
| Pencil Hardness | F |
| Gloss | |
| 20 deg | 73 |
| 60 deg | 101 |
| ⅛" conical Mandrell | fail |
| MEK double rubs | less than 200 |

We claim:

1. A curable polyester having a number average molecular weight of about 800 to about 6,000 and a weight average molecular weight of about 3,000 to about 40,000, comprising (a) about 20 to about 60 mol % of diol residues, based on the total moles of components (a), (b), (c), (d), (e) and (f);

(b) 3.5 to about 20 mol % of polyol residues, based on the total moles of components (a), (b), (c), (d), (e) and (f); wherein said polyol residues are selected from the group consisting of trimethylolpropane, trimethylolethane, glycerol, 2,2-bis(hydroxymethyl)-1,3-propanediol, 1,2,3,4,5,6-hexahydroxyhexane, and bis(2,2-bis(hydroxymethyl)-3-propanol ether;

(c) about 5 to about 40 mol % of hydroxy functionalized isophthalic acid residues, based on the total moles of (a), (b), (c), (d), (e) and (f); said hydroxy functionalized residues having the formula

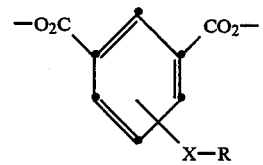

wherein X is selected from —O—, —S—, —SO$_2$— or —O—(CH$_2$—)$_n$ wherein n is 1 to about 6; R is a phenyl radical containing 1-3 hydroxy groups with the proviso that when X is —O— or —S—, that R may also be hydrogen;

(d) about 10 to about 40 mol % of diacid residues, derived from an aromatic diacid or a cycloaliphatic diacid or a mixture thereof, based on the total moles of (a), (b), (c), (d), (e) and (f);

(e) about 0 to about 40 mol % of diacid residues derived from an aliphatic diacid based on the total moles of components (a), (b), (c), (d), (e) and (f);

(f) 0 to about 10 mol % of residues derived from trimellitic acid or trimellitic anhydride, based on the total moles of components (a), (b), (c), (d), (e) and (f).

2. The curable polyester of claim 1, wherein the component (a) diol residues are selected from the group consisting of ethylene glycol; propylene glycol; 1,3-propanediol; 2,4-dimethyl-2-ethyl-hexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol, 1,6-hexanediol; 2,2,4-trimethyl-1,3-pentanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol; diethylene glycol, triethylene glycol; tetraethylene glycol; and pentaethylene, hexaethylene, heptaethylene, octaethylene, monaethylene, and decaethylene glycols.

3. The curable polyester of claim 1, wherein the component (c) hydroxy functionalized isophthalic acid residues are selected from the group consisting of

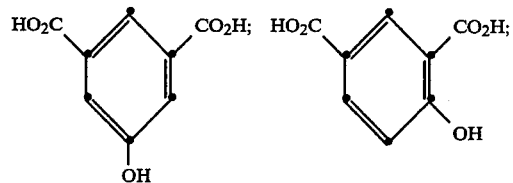

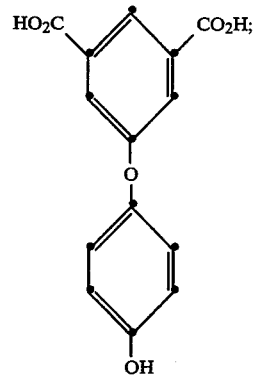

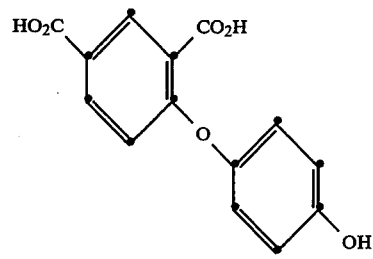

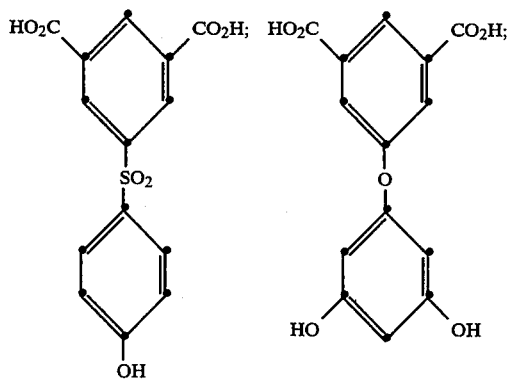

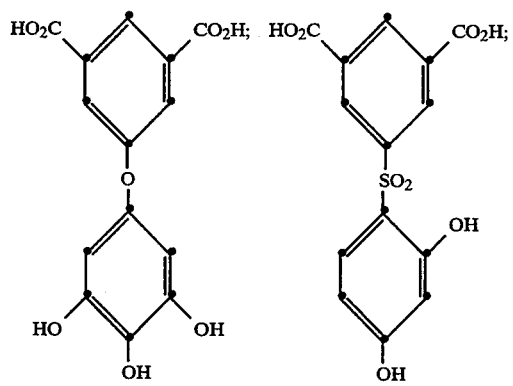

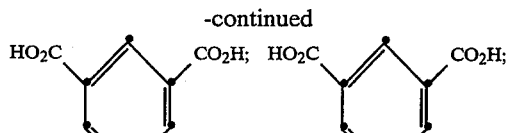

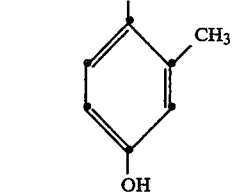

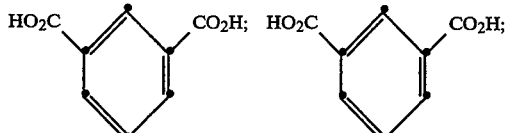

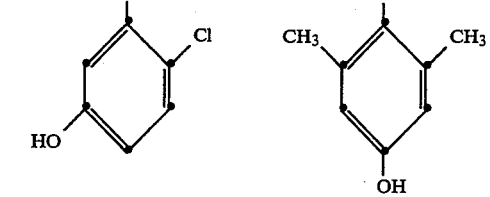

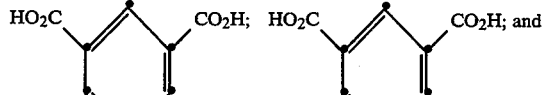

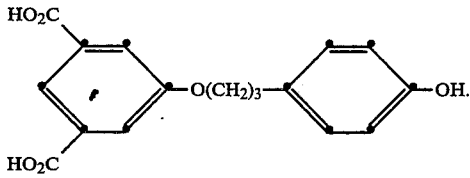

4. The curable polyester of claim 1, wherein component (c) is comprised of residues of 5-hydroxyisophthalic acid.

5. The curable polyester of claim 1, wherein the component (d) diacid residues are selected from the group consisting of residues of isophthalic, phthalic, terephthalic, diphenic, 4,4'-oxydibenzoic, 4,4'-sulfonyldibenzoic, 4,4'-biphenyldicarboxylic, naphthalenedicarboxylic, 1,2-cyclohexane dicarboxylic, 1,3-cyclohexane dicarboxylic, 1,4-cyclohexane dicarboxylic, and 1,4-cyclopentane dicarboxylic acids.

6. The curable polyester of claim 1, wherein the component (e) aliphatic diacid residues are selected from the group consisting of oxalic, malonic, dimethylmalonic, succinic, glutaric, adipic, trimethyladipic, pimelic, 2,2-dimethylglutaric, azelaic sebacic, fumaric, maleic, and itaconic acids.

* * * * *